United States Patent Office 2,794,819
Patented June 4, 1957

2,794,819
PRODUCTION OF METAL ALKYLS

Peter Smith, Norton-on-Tees, England, assignor to Imperial Chemical Industries Limited, a corporation of Great Britain No Drawing. Application November 15, 1954,
Serial No. 469,060

Claims priority, application Great Britain
November 18, 1953

8 Claims. (Cl. 260—448)

This invention relates to the production of aluminium alkyls.

Aluminium alkyls may be used as catalysts for the polymerisation of olefines.

Methods for the preparation of aluminium alkyls are known but all such methods involve double decomposition reactions. For example, lithium aluminium tetrapropyl may be reacted with a stoichiometric quantity of aluminium chloride to give aluminium tripropyl, the course of the reaction being represented by the following equation:

$$3LiAl(C_3H_7)_4 + AlCl_3 = 4Al(C_3H_7)_3 + 3LiCl$$

Such double decomposition reactions proceed slowly giving low yields of the aluminium alkyl and the isolation of the aluminium alkyl from the reaction product, substantially free from aluminium chloride, is a complicated operation.

I have now found that aluminium alkyls can very conveniently be produced in good yield and substantially free from impurities by a process in which a complex metal alkyl is decomposed in the presence as a catalyst of an amount of an aluminium halide which is substantially less than that used in the double decomposition reaction of the prior art which employs a stoichiometric quantity of the aluminium halide. Aluminium halides are Friedel-Craft type catalysts and we have also found that other Friedel-Craft type catalysts such as zinc chloride and ferric chloride catalyse the decomposition of complex metal alkyls.

This catalytic decomposition reaction may be exemplified by the following equation:

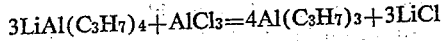

$$LiAl(C_3H_7)_4 \rightarrow LiC_3H_7 + Al(C_3H_7)_3$$

A particular advantage of the catalytic process of the present invention over the double decomposition process of the prior art resides in the fact that the alkali metal/carbon bond is not ruptured and that therefore an alkali metal alkyl is obtained as a valuable and useful by-product of the process.

According to the present invention, therefore, there is provided a process for the production of an aluminium alkyl which comprises decomposing a complex metal alkyl of aluminium and of an alkali metal at elevated temperature and substantially in the absence of moisture and oxygen, in the presence of a Friedel-Craft type catalyst as hereinafter defined.

Throughout this specification the term "complex metal alkyl" is used to denote an alkyl in which the alkyl groups are combined with aluminium and an alkali metal.

Complex alkyls of aluminium and of either lithium or sodium are particularly suitable for use in the process of the invention.

The Friedel-Craft type catalyst should not cause undesired decomposition reactions. For example, hydrogen fluoride is not a suitable catalyst in the process of the invention. Particularly suitable catalysts are aluminium halides, aluminium alkyl halides, zinc chloride and ferric chloride.

The decomposition of the complex metal alkyl is preferably carried out at such a reduced pressure that the aluminium alkyl distils from the reaction vessel as it is formed.

Preferably the decomposition is carried out in the presence of an inert solvent such as paraffinic and alicyclic hydrocarbons, for example decalin. The boiling point of the solvent at the reaction pressure should not be less than the reaction temperature. When the decomposition is carried out at reduced pressure it is preferred that the solvent distils with aluminium alkyl as the latter is formed.

The temperature at which the decomposition is carried out depends on the particular complex metal alkyl and should not exceed the temperature at which loss of olefines from either the complex or simple alkyl occurs. For example, since lithium aluminium tetrapropyl loses propylene at 250° C. at atmospheric pressure, the temperature to which it is subjected in order to decompose it to form aluminium tripropyl should not exceed 250° C. I prefer to carry out the decomposition at a temperature high enough, for example, not less than 100° C., to give a reasonably rapid rate of decomposition. Moisture and air should be excluded from the apparatus in order to avoid undesired decomposition of the alkyls.

The amount of Friedel-Craft type catalyst used may vary over a wide range. A suitable amount is from about 0.1 to about 5 moles per 100 moles of the complex alkyl while I prefer to use from 0.5 to 2 moles per 100 moles of the complex alkyl. By mole is meant the molecular weight corresponding to the simple molecular formula of the compound e. g. $AlCl_3$.

The complex metal alkyl used in the process of the present invention may be prepared as described in co-pending U. S. application Serial No. 469,037, filed November 15, 1954, and if the process of this co-pending application is used the decomposition of the complex metal alkyl according to the process of the present invention may be carried out without isolating the complex metal alkyl and in the same vessel as used for the production of the complex metal alkyl.

Example 1

54 grams of lithium aluminium tetraproply were heated in the presence of 0.5 gram aluminium chloride at 200° C. under an absolute pressure of 0.5 mm. mercury. Air and moisture were carefully excluded from the apparatus. Aluminium tripropyl distilled from the reaction vessel as it was formed and it was condensed to give 24 grams of aluminium tripropyl, a colourless mobile liquid boiling at 78° C. under a pressure of 1 mm. of mercury.

Example 2

12 grams of lithium aluminium hydride, 0.6 gram aluminium chloride, about 100 grams propylene and 100 ml. cyclohexane were introduced into a 1 litre glass-lined autoclave and heated at 120° C. for 3 hours. After cooling the cyclohexane was removed from the reaction product by vacuum distillation and the residue then heated at 200° C. under a pressure of 1 mm. mercury so that aluminium tripropyl distilled from the vessel as it was formed. The yield of aluminium tripropyl, boiling point 78° C. at a pressure of 1 mm. Hg, was 61% of the theoretical yield.

Example 3

5 grams lithium aluminium tetraethyl, 0.02 gram aluminium chloride and 20 ml. decalin, as a solvent, were heated at 100° C. under a pressure of 1 mm. Hg. Aluminium triethyl distilled with the decalin leaving a residue of lithium ethyl. The yield of aluminium triethyl was 55% of the theoretical yield.

The experiment was repeated under the same conditions and using the same quantities of materials except that the aluminium chloride catalyst was replaced by 0.02 gram of either ferric chloride or zinc chloride. The yields of aluminium triethyl were respectively 50% and 55% of the theoretical yield.

*Example 4*

2 grams of lithium aluminium hydride, an excess of ethylene, 0.02 gram aluminium chloride and 20 ml. decalin as a solvent were heated in a 1 litre autoclave at 120° C. for 3 hours. The reaction product was then distilled at 100° C. under a pressure of 1 mm. Hg so that the aluminium triethyl distilled with the decalin leaving a residue of lithium ethyl. The yield of aluminium triethyl was 56% of the theoretical yield.

*Example 5*

13 grams sodium aluminium tetraethyl and 0.3 gram aluminium chloride were heated at 200° C. under a pressure of 1 mm. Hg. Aluminium triethyl slowly distilled and was obtained in a yield of 60% of the theoretical yield.

I claim:

1. A process for the production of an aluminium alkyl which comprises decomposing a complex metal alkyl of aluminium and of an alkali metal wherein said alkyl is a lower alkyl group, at elevated temperature not exceeding the temperature at which loss of olefine occurs and substantially in the absence of moisture and oxygen, in the presence of a Friedel-Craft type catalyst selected from the group consisting of aluminium halides, zinc chloride and ferric chloride.

2. A process for the production of an aluminium alkyl which comprises decomposing a complex metal alkyl of aluminium and of an alkali metal wherein said alkyl is a lower alkyl group, at elevated temperature not exceeding the temperature at which loss of olefine occurs and substantially in the absence of moisture and oxygen, in the presence of a Friedel-Craft type catalyst selected from a group consisting of aluminium halides, zinc chloride and ferric chloride and in an amount which is equal to about 1 mole for each 100 moles of the complex metal alkyl.

3. A process for the production of an aluminium alkyl which comprises decomposing a complex metal alkyl of aluminium and of an alkali metal wherein said alkyl is a lower alkyl group, at elevated temperature not exceeding the temperature at which loss of olefine occurs, substantially in the absence of moisture and oxygen, and at such a reduced pressure that the aluminium alkyl distils from the reaction vessel as it is formed, in the presence of a Friedel-Craft type catalyst selected from the group consisting of aluminium halides, zinc chloride and ferric chloride.

4. A process for the production of an aluminium alkyl which comprises decomposing a complex metal alkyl of aluminium and of an alkali metal wherein said alkyl is a lower alkyl group, at elevated temperature not exceeding the temperature at which loss of olefine occurs, substantially in the absence of moisture and oxygen, and at such a reduced pressure that the aluminium alkyl distils from the reaction vessel as it is formed, in the presence of a Friedel-Craft type catalyst selected from the group consisting of aluminium halides, zinc chloride and ferric chloride, and in an amount which is equal to about 1 mole for each 100 moles of the complex metal alkyl.

5. A process as claimed in claim 4 whenever carried out at a temperature of at least 100° C.

6. A process for the production of an aluminium alkyl which comprises decomposing a complex metal alkyl of aluminium and of an alkali metal wherein said alkyl is a lower alkyl group, at elevated temperature not exceeding the temperature at which loss of olefine occurs, substantially in the absence of moisture and oxygen and in the presence of an inert solvent having a boiling point at the reaction pressure at least as high as the reaction temperature and in the presence of a Friedel-Craft type catalyst selected from the group consisting of aluminium halides, zinc chloride and ferric chloride.

7. A process for the production of an aluminium alkyl which comprises decomposing a complex metal alkyl of aluminium and of an alkali metal wherein said alkyl is a lower alkyl group, at elevated temperature not exceeding the temperature at which loss of olefine occurs, substantially, in the absence of moisture and oxygen and in the presence of an inert solvent having a boiling point at the reaction pressure at least as high as the reaction temperature and in the presence of a Friedel-Craft type catalyst selected from the group consisting of aluminium halides, zinc chloride and ferric chloride and in an amount which is equal to about 1 mole for each 100 moles of the complex metal alkyl.

8. A process as claimed in claim 7 whenever carried out at such reduced pressure that the aluminium alkyl distils from the reaction vessel as it is formed.

References Cited in the file of this patent

Grosse et al.: Jour. Org. Chem., vol. 5, pp. 106–121 (1940).